United States Patent [19]

Phelps et al.

[11] Patent Number: 4,667,741

[45] Date of Patent: May 26, 1987

[54] SODIUM HYDROXIDE TREATMENT OF FIELD WATER IN A BIOPOLYMER COMPLEX

[75] Inventors: Craig H. Phelps, Dallas; Krishnaswamy Sampath, Carrollton, both of Tex.

[73] Assignee: Mobil Oil Corporation, New York, N.Y.

[21] Appl. No.: 767,571

[22] Filed: Aug. 20, 1985

[51] Int. Cl.$^4$ .............................................. E21B 43/22
[52] U.S. Cl. ................................. 166/274; 166/246; 166/294; 252/8.554
[58] Field of Search ............... 252/8.55 R, 8.55 D, 252/8.5 C, 315.3; 166/274, 275, 246

[56] References Cited

U.S. PATENT DOCUMENTS

| | | |
|---|---|---|
| 3,243,000 | 3/1966 | Patton et al. ...................... 175/65 |
| 3,301,723 | 1/1967 | Chrisp ........................ 252/315.3 X |
| 3,301,848 | 1/1967 | Halleck .............................. 260/209 |
| 3,305,016 | 2/1967 | Lindblom et al. ...................... 166/9 |
| 3,383,307 | 5/1968 | Goetz ................................... 252/316 |
| 3,908,760 | 9/1975 | Clampitt et al. .................. 166/246 |
| 4,574,887 | 3/1986 | Abdo ............................. 252/8.55 X |

*Primary Examiner*—Herbert B. Guynn
*Attorney, Agent, or Firm*—A. J. McKillop; M. G. Gilman; C. A. Malone

[57] ABSTRACT

A method for reducing the gelation time of a biopolysaccharide which utilizes a hydroxide of an alkaline earth metal in an aqueous solution containing said biopolysaccharide wherein the mixture is afterwards complexed with a polyvalent metal ion. The resultant stable gel can be injected into a hydrocarbonaceous fluid formation for the recovery of hydrocarbonaceous fluids.

11 Claims, 1 Drawing Figure

SODIUM HYDROXIDE TREATMENT OF FIELD WATER IN A BIOPOLYMER COMPLEX

FIELD OF THE INVENTION

This invention relates to an improved method for making aqueous gels and uses thereof.

BACKGROUND OF THE INVENTION

Processes for the production of petroleum from a petroleum-containing subterranean formation employing an aqueous driving fluid containing a thickening agent are well known.

Oil accumulated within a subterranean formation can be recovered, or produced, through wells from the formation using the natural energy within the formation. However, producing operations deplete the natural energy relatively rapidly. Thus, a large amount of the oil is left in a subterranean formation if only the natural energy is used to produce the oil. This production be depletion of the natural energy is often referred to as primary production. Where natural formation energy is inadequate or has become depleted, supplementary operations, often referred to as secondary recovery operations, are used to improve the extent of oil recovery. In the most successful and widely used supplemental recovery operations, a fluid is injected through an injection means, comprising one or more injection wells. The fluid is passed into the formation, displacing oil within and moving it through the formation. The oil is produced from production means, comprising one or more production wells, as the injected fluid passes from the injection means toward the production means. In a particular recovery operation of this sort, water is employed as the injected fluid, and the operation is referred to as waterflooding. The injected water is referred to as the flooding water as distinguished from the in-situ, or connate, water.

While conventional waterflooding is effective in obtaining additional oil from an oil-containing subterranean formation, it has a number of shortcomings. Foremost among these shortcomings is the tendency of flooding water to "finger" through an oil-containing formation and to bypass substantial portions thereof. By fingering is meant the developing of unstable bulges or stringers which advance toward and into the production means more rapidly than the remainder of the flooding water. Furthermore, the water does not normally displace as much oil in the portions of the formation which it contacts as it potentially is capable of doing. In order to obtain a greater displacement of oil or other hydrocarbonaceous fluids, it has been suggested to increase the viscosity of flooding water.

Past suggestions for increasing the viscosity of flooding water have included incorporating water-soluble thickening additives in the water. Additives that have been suggested for this purpose include a wide variety of naturally occurring gums, sugars, and polymers. Bacterially produced heteropolysaccharides have been especially interesting as an additive for thickening flooding water. Also gels made from heteropolysaccharides have been used.

Clampitt et al. in U.S. Pat. No. 3,908,760 disclosed the use of aqueous mediums comprising new aqueous gels prepared from water and biopolysaccharides in secondary recovery operations for the recovery of oil. Clampitt et al. taught that pH was not controlling, but that higher pH retarded the gelation rate.

U.S. Pat. No.3,383,307 issued May 14, 1968, teaches Goetz' use of polysaccharides to gel water. A bacteria of the genus Xanthomonas was used. Goetz taught that the gel appeared to be reverible on the addition of strongly alkaline materials such as sodium hydroxide.

Previously, substantially large amounts of polyvalent metal ions were used to effect gel formation. However, use of substantially large amounts of polyvalent ions resulted in making gels of low stability. Therefore, what is needed is a method for rapidly forming gels of greater stability for use in recovering hydrocarbonaceous fluids from subterranean formations.

SUMMARY OF THE INVENTION

This invention is directed to a method for introducing a fluid medium into at least one borehole in the earth and into contact with a subterranean formation penetrated by said borehole where at least a portion of said liquid medium comprises an aqueous gel, and where said gel has water incorporated therein. The gel contains a substantially small amount of an alkali or alkaline earth metal hydroxide sufficient to cause rapid gelation of a water thickening amount of a water soluble biopolysaccharide or polysaccharide which is subsequently added to said water. Afterwards, the biopolysaccharide or polysaccharide is complexed with a substantially reduced amount of a water soluble compound of a polyvalent metal ion which amount is sufficient to cause gelation of said water soluble biopolysaccharide or polysaccharide which results in rapidly forming a gel of greater stability.

In one method, the borehole comprises an injection well which penetrates a hydrocarbonaceous fluid bearing formation which is also penetrated by at least one production well. This method comprises a fluid drive process carried out for the recovery of hydrocarbonaceous fluids from the formation by injecting a drive fluid into said formation via said injection well and driving the hydrocarbonaceous fluid to said production well. The fluid medium comprising said aqueous gel is introduced into said injection well and into the pores of said formation. In one embodiment, the formation is of non-uniform permeability and comprises at least one zone of relatively high permeability and at least one zone of relatively low permeability. The fluid medium is injected via the injection well into the formation prior to injecting the drive fluid into the formation. Thereafter, the fluid drive is used to drive the hydrocarbonaceous fluid, ahead of the fluid medium, to said production well.

It is therefore an object of this invention to form a gel by placing a biopolysaccharide or polysaccharide into an alkaline solution and subsequently complexing the mixture with a polyvalent metal ion.

It is a further object of this invention to form said gel with sodium hydroxide to obtain quicker and more efficient gelation.

It is a yet further object of this invention to reduce the quantity of polyvalent metal ions required for gel complexing which results in a quicker gelation time enabling a speedier injection of gel into the field.

It is a still further object of this invention to quickly make gels of greater stability.

BRIEF DESCRIPTION OF THE DRAWINGS

The drawing is a schematic illustration showing the placement of the fluid drive medium with the aqueous gel into a relatively high permeability zone.

DESCRIPTION OF THE PREFERRED EMBODIMENTS

Figure 1:
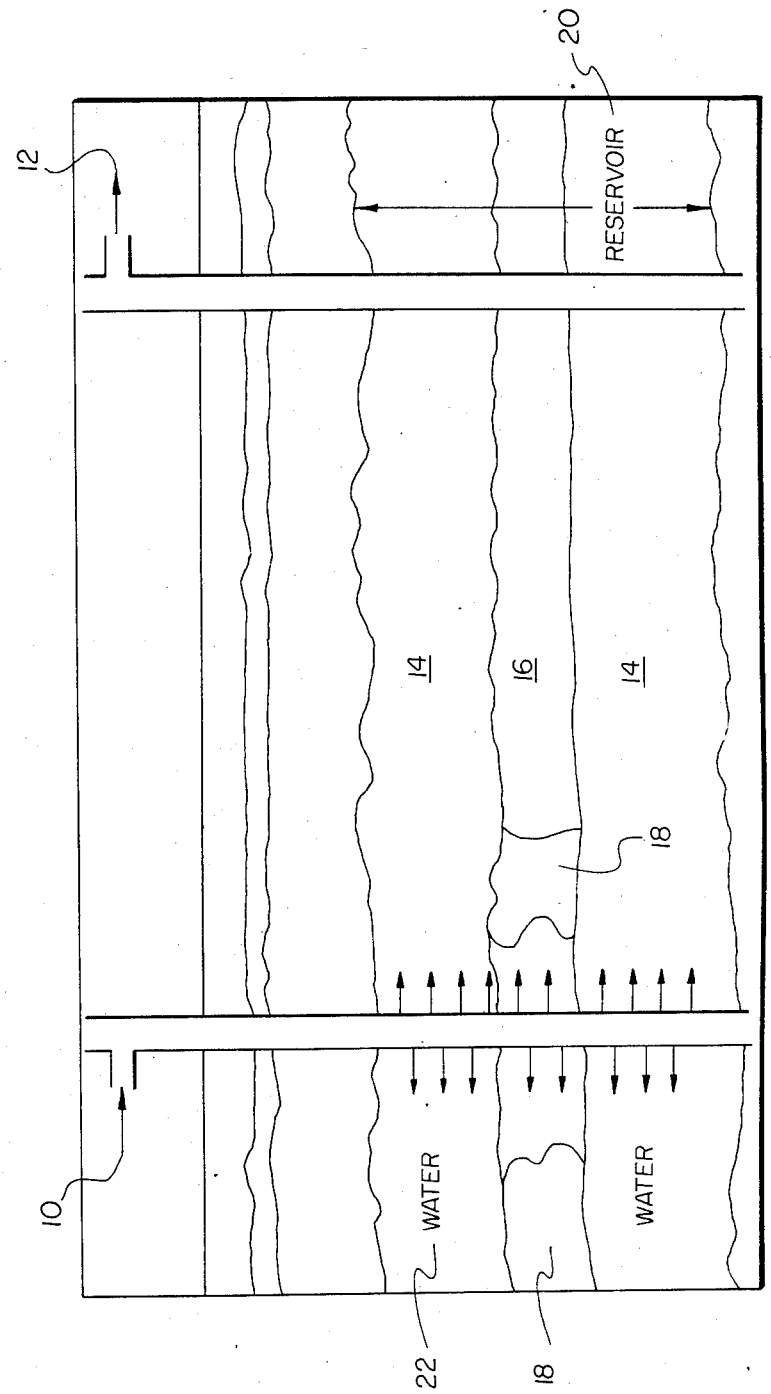

The present invention is directed to a method wherein a fluid medium is introduced into a borehole in the earth and into contact with a subterranean formation penetrated by said borehole. At least a portion of the fluid medium comprises an aqueous gel wherein said gel comprises water having incorporated therein an amount of an alkali or alkaline earth hydroxide suitable to cause a thickening and gelation of a biopolysaccharide or polysaccharide containing a polyvalent metal ion. Placement of the alkali metal hydroxide into the water causes quicker gelation of said saccharides than heretofore obtainable.

Alkali or alkaline earth metal hydroxides which will work in the method of this invention include those of a member selected from a group consisting of sodium hydroxide, potassium hydroxide, and calcium hydroxide. Said alkali or alkaline earth alkaline earth hydroxide is contained in said water in amount of from about 10 ppm to about 500 ppm preferably about 100 ppm. Although it is possible to add the alkaline metal hydroxide to the water after the introduction of the biopolysaccharide or polysaccharide, best results have been obtained when said hydroxide is added to said water prior to the introduction of said saccharides. Addition of the hydroxide in this manner allows for the formation of gels for use in environments, such as low pH brines.

The hydroxide, biopolysaccharide or polysaccharide, and polyvalent ions are generally mixed at ambient temperatures. Although no upper and lower temperature ranges have been designated, temperatures encountered have varied from about −4° F. (16° C.) to about 130° F. (54° C.).

The contemplated polyvalent metal ion selected for utilization herein is of a member selected from the group consisting of phosphorus, scandium, titanium, vanadium, chromium, manganese, iron, cobalt, copper, aluminum, arsenic, yttrium, zirconium, niobium, cadmium, tin, antimony, lanthanum, hafnium, tantalum, lead and mixtures thereof. Particularly preferred polyvalent metal ions are of chromium and titanium. A preferred utility for the polyvalent metal ion complex defined above is as a thickening agent for aqueous liquids for employment in oil recovery generally.

Examples of water soluble polyvalent metal compounds which can be the precursor for the subject metal ions are phosphorous tribromide, scandium nitrate, titanium tetrachloride, vanadium tribromide, chromium dichloride, manganese diiodide, iron bromide hexahydrate, cobalt chloride dihydrate, copper perchlorate, aluminum bromide hexahydrate, arsenic pentafluoride, yttrium bromide, zirconium tetrachloride, niobium oxychloride, cadmium iodate, tin dibromide diiodide, antimony trioxide, lanthanum chloride, hafnium oxychloride, tantalum fluoride, lead chlorate and mixtures thereof. These metal compounds are added to the mixture in an amount of from about 10 to about 1000 ppm of the active metal ion, preferrably about 40 to about 200 ppm. It is preferred to add said saccharide to the mixture prior to introducing the polyvalent ion.

In preparing the thickened aqueous liquid according to the present invention, either fresh or saline water can be employed. By fresh water is meant either distilled water, deionized water or water containing a comparatively low, i.e. less than 30,000 parts per million, dissolved salts. By saline water is meant water containing more than about 30,000 parts per million dissolved salts.

The polysaccharide used in accordance with the present invention is preferably a water-soluble biopolysaccharide produced by the action of bacteria of the genus Xanthomonas on a carbohydrate. Of course, as is known by those skilled in the art, other polysaccharides will work. Xanthomonas polysaccharides and their methods of preparation are well known to those skilled in the art, as disclosed, for example, in the Lindblom et al. U.S. Pat. No. 3,305,016 and in the Patton et al. U.S. Pat. No. 3,243,000, the entire disclosures of which are expressly incorporated herein by reference. Representative species of the genus Xanthomonas which may be employed to produce polysaccharides include *Xanthomonas begoiae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas, phaseoli, Xanthomonas pisi, Xanthomonas translucens, Xanthomonas vasculorum,* and *Xanthomonas vesicatoria.* A particular polysaccharide which is commercially available and is preferred for use in the present invention is the ionic polysaccharide B-1459 produced by fermentation of glucose with the bacterium *Xanthomonas campestris* NRRL B-1459, U.S. Department of Agriculture. This polysaccharide is produced by culturing the bacterium *Xanthomonas campestris* in a well aerated medium having a pH of about 7 which contains commercial glucose organic nitrogen sources, dipotassium hydrogen phosphate and appropriate trace elements. This polymer is available from the Kelco Chemical Company under trade name "Kelzan", or from Pfizer Chemical a Division of Pfizer, Inc.

The viscous liquid may contain from about 1000 to about 15000 ppm of Xanthomonoas polysaccharide and from about 10 to 1000 ppm of $Cr^{3+}$. A preferred narrower range is from about 1500 to about 4000 ppm of Xanthomonas polysaccharide per from about 20 to 400 ppm of $Cr^{3+}$. For example, about 2000 ppm of Xanthomonas polysaccharide may be complexed with from about 10 to about 200 ppm of $Cr^{3+}$.

Other polysaccharides, e.g. the scleroglucan and its derivatives may be utilized in this method. They are disclosed in U.S. Pat. No. 3,301,848 issued Jan. 31, 1967. The disclosure of this and any other referenced subject matter is incorporated herein by reference in its entirety.

In a preferred method, referring to FIG. 1, the borehole comprises an injection well 10 and said formation or reservoir 20 comprises an oil bearing formation which is also penetrated by a production well 12. This method is a fluid drive process carried out for the recovery of oil from the formation by injecting a drive fluid 22, for example, water, into said formation via said injection well 10 and driving oil to said production well 12. The fluid medium 18 comprising said aqueous gel is introduced into said injection well 10 and into the pores of said formation 20. In one embodiment, the formation is of non-uniform permeability and comprises at least one zone of relatively high permeability 16 and at least one zone of relatively low permeability 14. The fluid medium 18 is injected into the reservoir or formation prior to injecting the drive fluid 22 into the reservoir or formation 20 by way of said injection well 10 in the fluid drive process for driving oil to said production well.

In another embodiment of the process the formation is of non-uniform permeability and comprises at least one zone of relatively high permeability 16 and at least one zone of relatively low permeability 14 and the fluid medium 18 is injected into said formation subsequent to having injected a drive fluid 22 into said formation by way of said injection well 10 in the fluid drive process for driving said oil to the production well 12. U.S. Pat. No. 3,908,760 issued to Clampitt et al. on Sept. 30, 1975 gives a good discussion of use of gels and drive fluids. This patent is hereby incorporated in its entirety by reference.

The present invention is further concerned with a method of recovering oil from an oil-containing subterranean formation penetrated by a borehole which comprises injecting into said borehole an aqueous liquid thickened with biopolysaccharides or polysaccharides. In a more particular technique of recovering oil from an oil-containing subterranean formation, it is contemplated to employ an injection means and a production means which involves injecting through said injection means and into the subterranean formation an aqueous liquid containing a thickening amount of the above-identified biopolysaccharide/polyvalent metal complex.

The invention also comprises a method of preparing the biopolysaccharide/polyvalent metal ion complex defined above comprising dissolving said biopolysaccharide in water containing designated amounts of a hydroxide of an alkali or alkaline earth metal and adding thereafter a water-soluble polyvalent metal compound thereto.

By utilizing an alkali or alkaline earth metal hydroxide, a thickened gel of a biopolysaccharide complexed with a polyvalent metal ion is formed within a shorter time period. The reaction between said hydroxide and the polyvalent metal ion is more efficient which decreases the amount of polyvalent metal ion utilized. This results in a quicker forming gel having substantially greater stability characteristics.

The invention is further amplified when the following examples are considered.

Two solutions containing 2,000 ppm each of biopolysaccharide broths sold under the Pfizer 4800 and Kelco Kelzan VCB tradenames were prepared. These polymers are available from Pfizer, Inc. and Kelco Company, a division of Merck Incorporated respectively. These solutions were prepared in Synthetic Salt Creek Water ("SSCW"). SSCW containing 62000 ppm of sodium chloride was utilized to simulate salt water found in a formation under inspection for the production of hydrocarbonaceous fluids. A water soluble chromium compound sufficient to release 70 and 80 ppm of chromic ions was added to the respective samples. No sodium hydroxide or other hydroxide of an alkaline earth metal was added. Rapid gelation did not occur.

Next two samples containing 2,000 ppm of Pfizer 4800 each were mixed with SSCW containing 100 ppm of sodium hydroxide. Subsequently, a polyvalent metal compound in a quantity sufficient to release 80 ppm of active trivalent chromic ions was added to the respective solutions.

Similarly, two samples of Kelco Kelzan VCB were prepared which contained 2,000 ppm of the biopolysaccharide. The samples were treated in a manner similar to the Pfizer 4800 samples except active chromic ions were added in 60 and 80 ppm quantities respectively.

On the addition of 80 ppm chromium ions, the Pfizer and Kelco broths formed gels rapidly, in 1 to 3.5 hours. These gels were then sheared in a blender and the re-healing characteristics were observed. All the gels reformed quickly. The gels were then placed in an oven at 130° F. (54° C.) and observed. Gels prepared from the broths were still stable, after 5 weeks at 130° F. (54° C.). Gels formed using the Kelzan broth and 60 ppm chromium and also stable after 5 weeks, losing less than 10% of water.

Unreliable and unfavorable results were obtained from some broths; These results are not included herein below.

The results above where sodium hydroxide was utilized are shown below in Table 1.

TABLE 1

Gel Formation and Stability Test Results for 2000 ppm Polymer Solution in Synthetic Salt Creek Water Treated with 100 ppm NaOH

| Broth | $CR^{+3}$ Concentration ppm | Initial Gelation Time, hrs. | Recovery after Shear | Stability at 130° F. (after 5 weeks) |
|---|---|---|---|---|
| Pfizer 4800 | 80 | 3 | Rapid | Good |
| Kelco Kelzan VCB | 60 | 3.5 | Rapid | Good |
| Kelco Kelzan VCB | 80 | 3.5 | Rapid | Good |

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

We claim:

1. In a method for making an aqueous gel formed from a polysaccharide which gel is used as a fluid medium in a subterranean formation for the production of hydrocarbonaceous fluids, the improvement comprising:
   (a) mixing a substantially small amount of an alkali or alkaline earth metal hydroxide sufficient to cause gelation with a water soluble scleroglucan polysaccharide within a substantially effective time period where said hydroxide is contained in an aqueous solution in an amount of from about 1 to about 500 ppm which solution also contains a water thickening amount of said water soluble scleroglucan polysaccharide; and then
   (b) complexing said polysaccharide with an amount of a water-soluble compound of a polyvalent metal ion selected from the group consisting of trivalent phosphorus, scandium, titanium, vanadium, chromium, manganese, iron, cobalt, copper, aluminum, arsenic, yttrium, zirconium, niobium, cadmium, tin, antimony, lanthanum, hafnium, tantalum, lead and mixtures thereof, sufficient to cause gelation of said water soluble polysaccharide thereby forming a stable gel, wherein said water soluble compound is added to said aqueous solution in an amount of from about 10 to about 1000 ppm of the active polyvalent metal ion.

2. The method as recited in claim 1 where in step (a) said hydroxide is a member selected from the group consisting of sodium hydroxide, potassium hydroxide, and calcium hydroxide.

3. The method as recited in claim 1 where in step (a) said polysaccharide is contained in said water in an amount of from about 1,000 to about 15,000 ppm.

4. A method as recited in claim 1 where shearing occurs when said medium is injected into said formation and subsequent thereto said gel is substantially rehealed and reformed so as to become effective in removing hydrocarbonaceous fluids from said formation within about 2 hours.

5. A method as recited in claim 1 where in step (b) gelation occurs within about 4 hours.

6. In a method for introducing a fluid medium into an injection well penetrating a subterranean hydrocarbonaceous fluid containing formation which well is fluidly connected with at least one production well where a fluid drive comprises a mobility control agent and is used to recover said hydrocarbonaceous fluid from said formation the improvement comprising utilization of an aqueous gel in said fluid medium which gel comprises:
   (a) mixing a substantially small amount of an alkali or alkaline earth metal hydroxide sufficient to cause gelation within a substantially effective time period where said hydroxide is contained in an aqueous solution in an amount of from about 1 to about 500 ppm which solution also contains a water thickening amount of a water soluble scleroglucan polysaccharide; and then
   (b) complexing said polysaccharide with an amount of a water-soluble compound of a polyvalent metal ion selected from the group consisting of trivalent phosphorus, scandium, titanium, vanadium, chromium, manganese, iron, cobalt, coppr, aluminum, arsenic, yttrium, zirconium, niobium, cadmium, tin, antimony, lanthanum, hafnium, tantalum, lead and mixtures thereof, sufficient to cause gelation of said water soluble biopolymer thereby forming a stable gel, wherein said water soluble compound is added to said aqueous solution in an amount of from about 10 to about 1000 ppm of the active polyvalent metal ion.

7. The method as recited in claim 6 where in step (a) said hydroxide is a member selected from the group consisting of sodium hydroxide, potassium hydroxide, and calcium hydroxide.

8. A method as recited in claim 6 where shearing occurs when said medium is injected into said formation and subsequent thereto said gel is substantially rehealed and reformed so as to become effective in removing hydrocarbonaceous fluids from said formation within about 2 hours.

9. A method as recited in claim 6 where in step (b) gelation occurs within about 4 hours.

10. The method as recited in claim 6 where in step (a) said biopolysaccharide is contained in said water in an amount of from about 1,000 to about 15,000 ppm.

11. A waterflood method for recovering hydrocarbonaceous fluids from an oil reservoir which has zones of varying permeability and which formation is penetrated by an injection and a production well comprising:
   (a) mixing a substantially small amount of an alkali or alkaline earth metal hydroxide sufficient to cause gelation within a substantially effective time period where said hydroxide is contained in an aqueous solution in an amount of from about 1 to about 500 ppm which solution also contains a water thickening amount of a water soluble scleroglucan polysaccharide; then
   (b) complexing said polysaccharide with an amount of a water-soluble compound of a polyvalent metal ion selected from the group consisting of trivalent phosphorus, scandium, titanium, vanadium, chromium, manganese, iron, cobalt, copper, aluminum, arsenic, yttrium, zirconium, niobium, cadmium, tin, antimony, lanthanum, hafnium, tantalum, lead and mixtures thereof, sufficient to cause gelation of said water soluble polysaccharide thereby forming a stable gel, wherein said water soluble compound is added to said aqueous solution in an amount of from about 10 to about 1000 ppm of the active polyvalent metal ion;
   (c) injecting said stable gel into said reservoir via said injection well; and
   (d) thereafter injecting water as a drive fluid behind said stable gel and recovering hydrocarbonaceous fluids.

* * * * *

UNITED STATES PATENT AND TRADEMARK OFFICE
CERTIFICATE OF CORRECTION

PATENT NO. : 4,667,741

DATED : May 26, 1987

INVENTOR(S) : Craig H. Phelps & Krishnaswamy Sampath

It is certified that error appears in the above-identified patent and that said Letters Patent is hereby corrected as shown below:

Column 1, line 22, "be" should read --by--.

Column 2, line 6, "reverible" should read --reversible--.

Column 6, line 12, "and" should read --are--.

Column 7, line 38, "coppr" should read --copper--.

Signed and Sealed this

Eighth Day of December, 1987

Attest:

DONALD J. QUIGG

Attesting Officer      Commissioner of Patents and Trademarks